(12) United States Patent
McIntyre et al.

(10) Patent No.: US 11,273,676 B2
(45) Date of Patent: Mar. 15, 2022

(54) SYSTEM AND METHOD FOR DIRECT COMMUNICATIONS BETWEEN TIRE SENSORS

(71) Applicant: Continental Automotive Systems, Inc., Auburn Hills, MI (US)

(72) Inventors: Matthew D. McIntyre, New Baltimore, MI (US); Jean-Christophe Deniau, Fenton, MI (US); Brian Hillawi, Farmington Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 282 days.

(21) Appl. No.: 16/713,341

(22) Filed: Dec. 13, 2019

(65) Prior Publication Data

US 2021/0178838 A1 Jun. 17, 2021

(51) Int. Cl.
*B60C 23/04* (2006.01)
*H04W 84/18* (2009.01)

(52) U.S. Cl.
CPC ...... *B60C 23/0462* (2013.01); *B60C 23/0474* (2013.01); *B60C 23/0488* (2013.01); *H04W 84/18* (2013.01)

(58) Field of Classification Search
CPC ............ B60C 23/0462; B60C 23/0415; B60C 23/0433; B60C 23/0437; B60C 23/0444; B60C 23/0483; B60C 23/045; B60C 23/0474; B60C 23/0488; H04W 84/18
USPC ....... 340/447–449, 464, 472, 477, 488, 517, 340/539.22, 3.43–3.44
See application file for complete search history.

(56) References Cited

U.S. PATENT DOCUMENTS

| | | | |
|---|---|---|---|
| 2003/0164033 A1* | 9/2003 | Ghabra | H03C 1/46 73/146 |
| 2005/0063363 A1* | 3/2005 | Lazar | H04L 12/2801 370/352 |
| 2009/0121858 A1* | 5/2009 | Desai | B60R 25/24 340/447 |
| 2014/0005880 A1* | 1/2014 | Guenkova-Luy | H04L 67/12 701/31.4 |
| 2016/0361958 A1* | 12/2016 | Steiner | B60C 23/04 |
| 2019/0084359 A1* | 3/2019 | Hassani | H04B 17/27 |
| 2019/0248193 A1* | 8/2019 | Scheibenzuber | B60C 23/0442 |

* cited by examiner

*Primary Examiner* — Daniel Previl (57) ABSTRACT

Approaches are provided where direct communications between tire pressure sensors are provided. One sensor may act as a teacher while other sensors may act as students and learn from the teacher sensor.

18 Claims, 7 Drawing Sheets

SYSTEM AND METHOD FOR DIRECT COMMUNICATIONS BETWEEN TIRE SENSORS

TECHNICAL FIELD

This disclosure relates to communications between tire sensors.

BACKGROUND

Tire pressure monitoring sensors obtain the pressure of a tire. These devices might also obtain other information such as the temperature of the air in the tire. Once they obtain this information, the information is typically sent to a vehicle control unit (or receiver) in the vehicle. The receiver analyzes the tire pressure information and if the pressure is too low, may issue a warning to the driver of the vehicle.

BRIEF DESCRIPTION OF THE DRAWINGS

For a more complete understanding of the disclosure, reference should be made to the following detailed description and accompanying drawings wherein.

DETAILED DESCRIPTION

Generally speaking, approaches are provided where direct communications between tire pressure sensors are provided. The communications (with respect to an individual sensor) may be bi-directional (the sensor sends communications directly to other sensors and receives other communications directly, from other sensors). In other aspects, the direct communications may be uni-directional (the sensor either transmits messages directly to other sensors or receives communications directly from other sensors). By direct communications, it is meant that communications are sent without the intervention, actions; or processing of another device. In one example, the communications from one sensor to another sensor do not have to pass through a repeater or vehicle control unit in order to be received at another sensor or transmitted to another sensor. In other words, the need for an intermediate device in sensor-to-sensor communications is eliminated.

In aspects, the ability to provide direct communication allows group interaction to occur where the interaction between group members (the sensors) is direct. In one example, one or more sensors may act as a teacher and this "teacher" sensor instructs or teaches protocols or other information to the "student" sensors. It will be appreciated that, in one example, sensor-to-sensor communication is between sensors at the same vehicle, but in other examples, sensor-to-sensor communication between sensors in different vehicles is also possible.

In many of these embodiments, a tire pressure monitoring sensor includes a pressure sensing device, a transmission buffer, a transmitter circuit, a receiver circuit, and a control circuit. The pressure sensing device is configured to sense pressure information of a tire. The transmission buffer is coupled to the sensing device, and the transmission buffer is utilized to store the sensed pressure information.

The transmitter circuit is coupled to the transmission buffer. The receiver circuit is configured to receive information directly from other TPM sensors.

The control circuit is coupled to the pressure sensing device, the transmitter circuit, and the receiver circuit. The control circuit is configured to transmit first messages directly to other sensors via the transmission buffer and transmitter circuit, and directly receive second messages from other sensors via the receiver circuit. The TPM sensor is configured to operate as a teacher sensor to the other sensors. The first messages sent by the TPM sensor to the other sensors include first validity information that ensures that an incorrect transmission protocol is not selected or utilized by the other sensors.

In aspects, the first validity information includes centripetal acceleration information from the TPM sensor, pressure information from the TPM sensor, and temperature information from the TPM sensor. Other examples are possible.

In other examples, the TPM sensor is configured to receive the second messages from another teacher TPM sensor and to determine a transmission protocol based upon the second messages. The second messages sent by another teacher TPM sensor include second validity information and the second validity information is utilized by the TPM sensor to ensure that an incorrect transmission protocol is not selected or utilized by the TPM sensor. In aspects, the second validity information includes centripetal acceleration information from the other TPM teacher sensor, pressure information from the other TPM teacher sensor, and temperature information from the other TPM teacher sensor. In this example, the TPM sensor is acting as a student and this can occur at any time (e.g., before or after the TPM sensor operates as a teacher).

In other examples, the sensor stores vehicle information associated with the vehicle to which it is deployed and transmits the vehicle information to other sensors in other vehicles to establish a record of sensor deployment. In other words, sensors in different vehicles can communicate directly with each other for a variety of different purposes.

In still other examples, the transmitted and received messages utilize one or more of the Bluetooth protocol, the Bluetooth low energy (BLE) protocol, or radio frequency (RF) communications. Other examples are possible.

In other examples, the sensor further comprises a memory storage device. The memory storage device includes a mapping, and the mapping comprises a plurality of identifier ranges being programmatically mapped to a plurality of protocols, each of the protocols being associated with an automobile manufacturer. In other examples, the memory storage device includes a plurality of protocols, which are activated by flipping bits in the memory storage device.

In still other of these embodiments, pressure information of a tire is sensed at a pressure sensing device at a tire pressure monitoring (TPM) sensor. The sensed pressure information is stored at a transmission buffer at the TPM sensor. First messages are transmitted directly to other sensors via the transmission buffer and a transmitter circuit at the TPM sensor. In addition, second messages are directly received from other sensors via a receiver circuit at the TPM sensor.

The TPM sensor is configured to operate as a teacher sensor to the other sensors. The first messages sent by the TPM sensor to the other sensors include validity, information that ensure that an incorrect transmission protocol is not selected or utilized by the other sensors.

In others of these embodiments, a computer readable non-transitory medium has a computer readable program code embodied therein. The computer readable program code is adapted to be executed to implement a method of operating a tire pressure monitoring system. The method comprises: sensing pressure information of a tire at a pressure sensing device at a tire pressure monitoring (TPM) sensor; storing the sensed pressure information at a transmission buffer at the TPM sensor; transmitting first messages directly to other sensors via the transmission buffer and a transmitter circuit at the TPM sensor; and directly receiving second messages from other sensors via a receiver circuit at the TPM sensor. The first messages sent by the TPM sensor to the other sensors include information that ensure that an incorrect transmission protocol is not selected or utilized by the other sensors.

In yet others of these embodiments, a student sensor listens for instructions from one or more teacher sensors. A message from a teacher may be received at the student sensor. The student sensor may validate that the message is from an authorized teacher sensor (e.g., the teacher sensor is on the same vehicle as the student sensor). Once the validation is made; then the student sensor may configure itself according to the instructions in the message received from the teacher sensor. In one aspect, configuring may include establishing that the student sensor transmits messages according to one or more protocols. In examples, the protocols have already been programmed at the student sensor but are not activated (e.g., by flipping a logical switch) at the student sensor.

In still others of these embodiments, sensors can switch roles at different times and based upon different circumstances. For example, a student sensor may become a teacher sensor once it has been configured by the teacher sensor, and (the new teacher) can, in turn, teach other sensors. In this way, teachers sensors may propagate instructions across a vehicle or between vehicles one sensor at a time.

In still others of these embodiments, a system of one or more teacher sensors and one or more student sensors can be configured and operated (e.g., four sensors at a vehicle). Each of these sensors may operate according to the approaches described elsewhere herein.

Advantageously, the use of teacher sensors allows other sensors in the vehicle to be easily and quickly performed. A teacher sensor may be manually programmed or programmed from a sensor at another vehicle to mention two examples.

Figure 1:
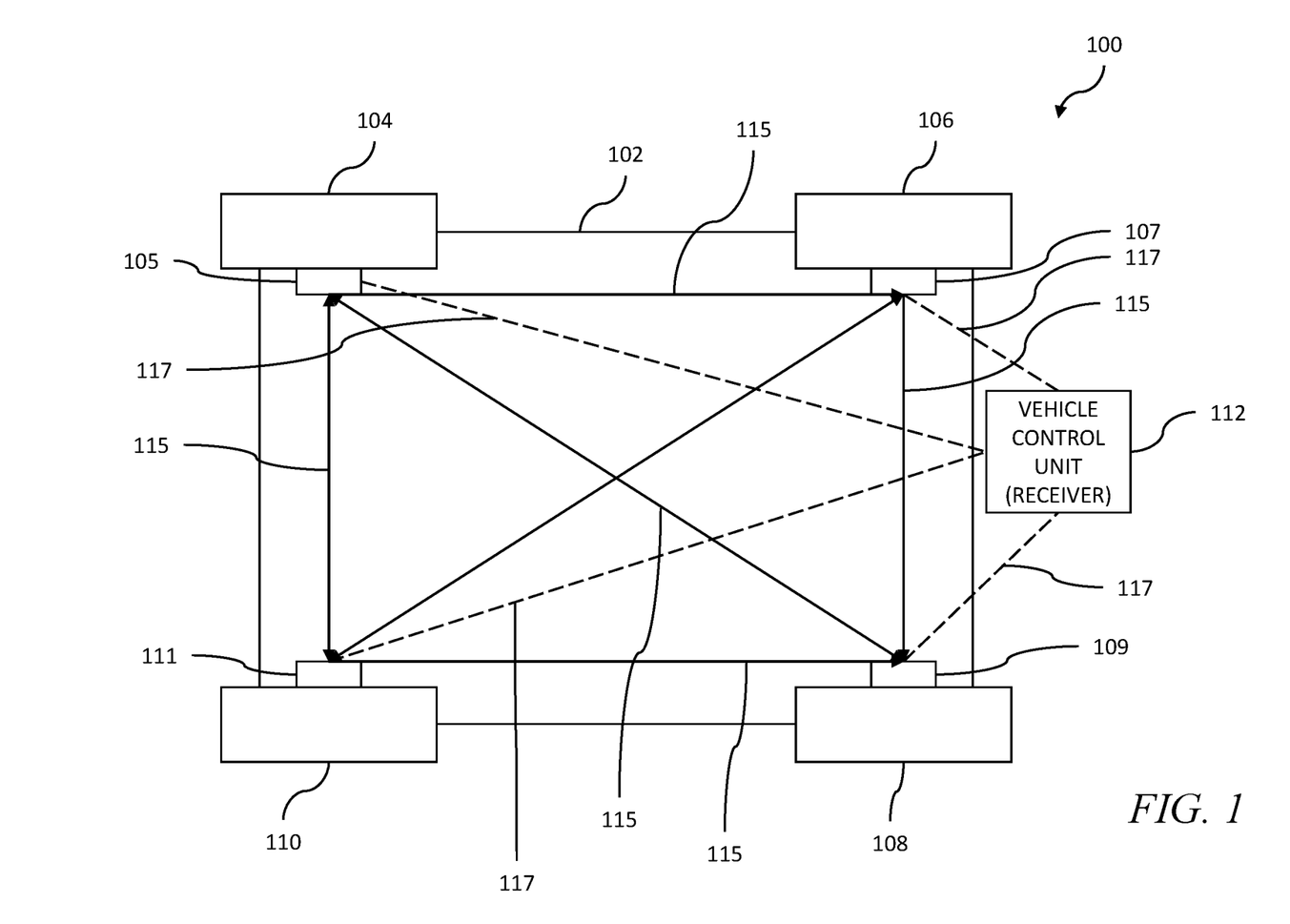
FIG. 1 comprises a diagram of a system as configured in accordance with various embodiments of these teachings.

Referring now to FIG. 1, one example of a system 100 for operating TPM sensors is described. A vehicle 102 includes a first tire 104 (with first TPM sensor 105), a second tire 106 (with a second TPM sensor 107), a third tire 108 (with a third TPM sensor 109), and a fourth tire 110 (with a fourth TPM sensor 111). A vehicle control unit (or receiver unit) 112 is also disposed in the vehicle 102.

The tires in aspects are typical tires filled with air (or other gasses) as known in the art. The sensors 105, 107, 109, and 111 have a structure that is described in greater detail elsewhere herein.

The vehicle control unit (or receiver) 112 includes a transceiver and can transmit and receive messages to the sensors 105, 107, 109, and 111. The vehicle control unit 112 is also coupled to other instruments or devices in the vehicle. In some aspects, the vehicle control unit 112 is coupled to a screen on the dashboard (or in some other location viewable by the driver and/or passenger of the vehicles). The vehicle control unit 112 may receive pressure information from the sensors 105, 107, 109, and 111 and when the pressure indicated by the pressure information is below a predetermined threshold, display a warning to the driver (or other occupants) to take action such as replacing the tire or adding air to the tire. Communication paths between the sensors 105, 107, 109, and 111 and the vehicle control unit are indicated by the lines labeled 117.

In one example of the operation of the system of FIG. 1, pressure information of one of the tires 104, 106, 108, or 110 is sensed at a pressure sensing device at one of the sensors 105, 107, 109, or 111. The sensed pressure information is stored at a transmission buffer at the particular sensor. Messages are transmitted directly to other ones of the sensors via the transmission buffer and a transmitter circuit at the transmitting TPM sensor. In addition, messages are directly received from other sensors via a receiver circuit at the receiving TPM sensor.

In this example, the sensors 105, 107, 109, or 111 communicate directly with each other (these communications paths are indicated by the lines labeled 115). By direct and in this example, the sensors communicate without required intervention, processing, and/or action of some other device at the vehicle. In other words, each sensor independently and without the intervention of any other device (including any other sensor) can receive messages from other sensors and recognize the messages. Similarly, a sensor can send a message directly to another sensor and can transmit messages to other sensors without the intervention, processing, and/or action of another sensor. For instance, the vehicle control unit 112 (or any other device in the vehicle) does not need to first receive and process a message from one sensor before the other sensor can receive and recognize the message. In addition, vehicle control unit 112 does not need to initiate a conversation between one or multiple sensors.

In aspects, one or more of the sensors 105, 107, 109, or 111 is configured to operate as a teacher sensor to the other sensors. The messages sent by the teacher sensor to the other sensors include information that ensures that an incorrect transmission protocol is not selected or utilized by the other sensors.

Once this information is received, one or more protocols can be activated in the student sensor. In aspects, bits can be switched in memory to activate a protocol that has been pre-programmed into the sensor. In other examples, protocol information can be included in the message. Once the protocol is activated, the sensor can transmit messages to the vehicle control unit 112 according to this protocol.

Figure 2:
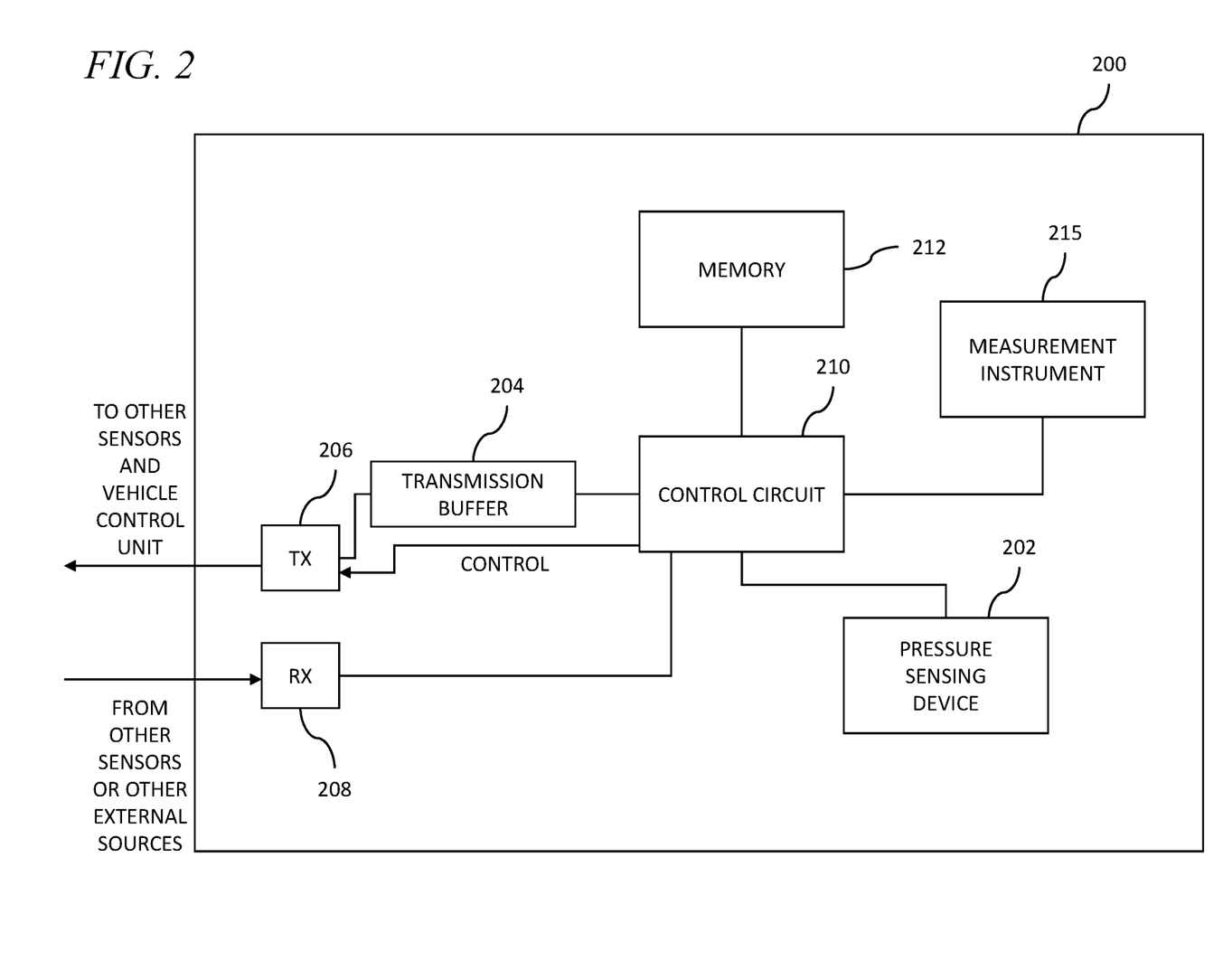
FIG. 2 comprises a flowchart as configured in accordance with various embodiments of these teachings.

Referring now to FIG. 2, one example of a TPM sensor 200 (such as the sensors 105, 107, 109, and 111) is described. The sensor 200 includes a pressure sensing device 202, a transmission buffer 204, a transmitter circuit 206, a receiver circuit 208, a control circuit 210, and an electronic memory storage device 212.

The pressure sensing device 202 is configured to sense pressure information of a tire. In these regards, the pressure sensing device 202 includes mechanical components such as valves, valve stems, and measurement equipment that is effective to measure the air pressure of a tire. The pressure sensing device 202 may also include instruments (or some other separate device may include these instruments) to measure other tire parameters such as the temperature of the tire, the tire patch area, tire tread, and other parameters.

The transmission buffer 204 is coupled to the sensing device, and the transmission buffer 204 is utilized to store the sensed pressure information. the transmission buffer 204, in aspects, is a temporary electronic memory storage device.

The transmitter circuit 206 is coupled to the transmission buffer 204. The transmitter circuit 206 includes electric hardware and/or computer software that is configured to transmit messages from the sensor. In examples, the transmitter circuit includes an antenna or multiple antennas and is configured to format messages from the transmission buffer 206 according to a desired transmission protocol.

The receiver circuit 208 is configured to receive information directly from other TPM sensors. The receiver circuit 208 includes electric hardware and/or computer software that is configured to receive messages from outside sources such as vehicle control units or other sensors.

The electronic memory storage device 212 includes a mapping, and the mapping comprises a plurality of identifier ranges being programmatically mapped to a plurality of protocols, each of the protocols being associated with an automobile manufacturer. In other examples, the electronic memory storage device 212 includes a plurality of protocols that are activated by, for instance, flipping a bit in the memory 212. The memory storage device may be any type of temporary or permanent electronic memory device. In other aspects, the electronic memory storage device 212 includes preprogrammed protocols (e.g., programmed into the memory device 212 during manufacturing) that can be activated as described elsewhere herein.

In yet other aspects, the sensor 200 also includes a measurement instrument 215. In one example, the measurement instrument 215 is an accelerometer that measures the acceleration of the sensor 200. Acceleration information from one sensor can be compared to acceleration information on another sensor to, for example, determine if both sensors are on the same vehicle (e.g., when the measured accelerations are within predetermined threshold tolerances of each other. In another example, the measurement instrument 215 is a thermometer. In other examples, multiple measurement instruments (e.g., an accelerometer and a thermometer) can be deployed.

The control circuit 210 is coupled to the pressure sensing device 202, the transmission buffer 204, the transmitter circuit 206, and the receiver circuit 208. The term "control circuit" refers broadly to any one (or more) microcontrollers, computers, or processor-based devices with processors, memories, and programmable input/output peripherals, which are generally designed to govern the operation of other components and devices. It is further understood to include common accompanying accessory devices, including memory, transceivers for communication with other components and devices, etc. These architectural options are well known and understood in the art and require no further description here. The control circuit 210 may be configured (for example, by using corresponding programming stored in a memory as will be well understood by those skilled in the art) to carry out one or more of the steps, actions, and/or functions described herein.

The control circuit 210 is configured to transmit messages directly to other sensors via the transmission buffer 204 and the transmitter circuit 206, and directly receive messages from other sensors via the receiver circuit 208. In aspects, the TPM sensor 200 is configured to operate as a teacher sensor for other sensors. The messages sent by the sensor 200 to the other sensors include validity information that ensures that an incorrect transmission protocol is not selected or utilized by the other sensors.

In aspects, the validity information sent by the sensor 200 to another sensor includes centripetal acceleration information from the TPM sensor 200, pressure information from the TPM sensor 200, and temperature information from the TPM sensor 200. Other examples are possible.

In still other examples, the TPM sensor 200 is configured to receive the messages from another sensor that is acting as a teacher. This may occur before the sensor 200 acts as a teacher. In other words, the sensor 200 may at an initial point in time be acting as a student sensor, but subsequently at a later point in time act as a teacher as described above. When acting as a student, the TPM sensor 200 determines a transmission protocol based upon messages received from another teacher sensor. The messages sent by the other teacher TPM sensor to the sensor 200 also include validity information and this validity information is utilized by TPM sensor 200 to ensure that an incorrect transmission protocol is not selected or utilized. In aspects, this validity information includes centripetal acceleration information from the other TPM teacher sensor, pressure information from the other TPM teacher sensor, and temperature information from the other TPM teacher sensor.

In other examples, the sensor 200 stores vehicle information associated with the vehicle to which it is deployed and transmits the vehicle information to other sensors in other vehicles to establish a record of sensor deployment. In other examples, other types of information may be passed from one sensor in a first vehicle to another sensor in a second vehicle. For instance, information indicating that a tire is flat may be passed from the first sensor to the second sensor. This information may serve to warn or alert occupants of the second vehicle that a tire in the first vehicle has problems. The type of information passed from the first vehicle may be a direct message "Tire in vehicle 1 is flat or under-pressured") or indirect (e.g., pressure or acceleration information that indicates a tire in the first vehicle is flat or under-pressured).

In still other examples, the transmitted and received messages to or from the sensor 200 utilize one or more of the Bluetooth protocol, the Bluetooth low energy (BLE) protocol, or radio frequency (RF) communications. Other types of transmission protocols may also be used.

Figure 3:
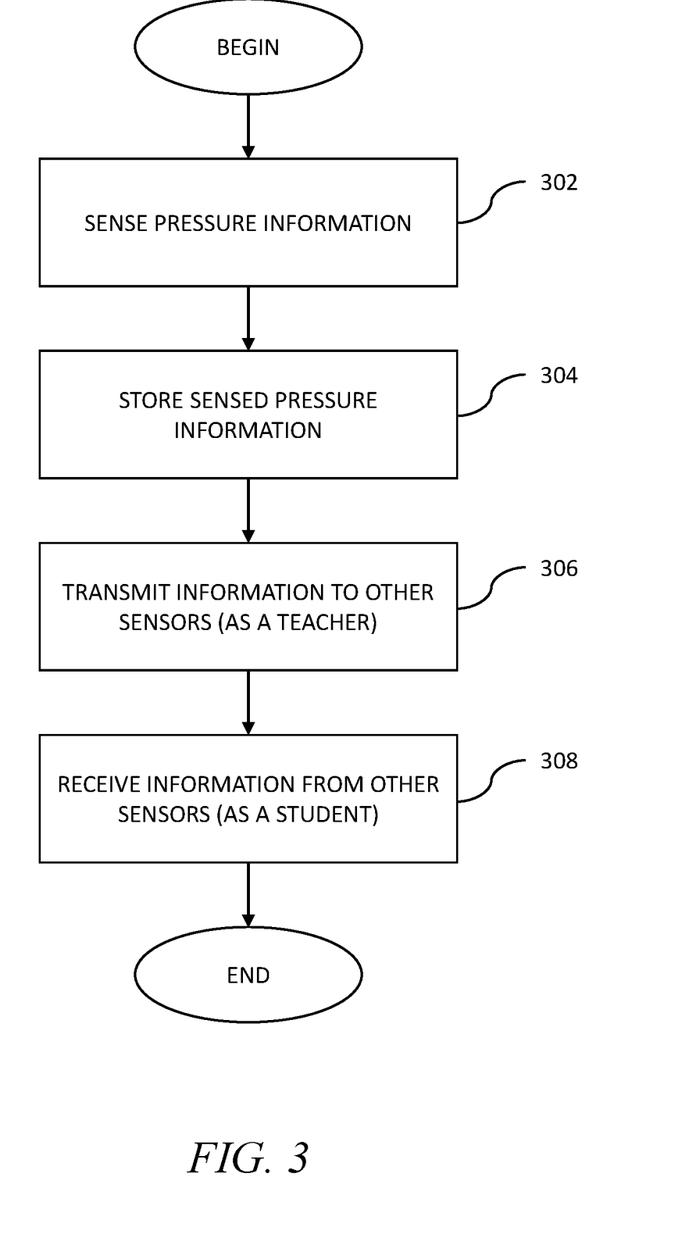
FIG. 3 comprises a flow diagram as configured in accordance with various embodiments of these teachings.

Referring now to FIG. 3, one example of an approach for operating a TPM sensor is described.

At step 302, pressure information of a tire is sensed at a pressure sensing device at a tire pressure monitoring (TPM) sensor. In one example, a tire pressure sensing device in the tire measures the pressure in the tire.

At step 304, the sensed pressure information is stored at a transmission buffer at the TPM sensor. The transmission buffer acts as a temporary store before the information is transmitted by a transmission circuit. The sensed pressure information may be received at a vehicle control unit or receiver. When the measured pressure is below a threshold, a warning may be rendered to a driver on the vehicle.

The transmitter device can be used to transmit other messages directly to other sensors without having the messages pass through the vehicle control unit. At step 306, first messages are transmitted directly to other sensors via the transmission buffer and the transmitter circuit at the TPM sensor. In this case, the TPM sensor is configured to operate as a teacher sensor to the other sensors.

The messages sent by the TPM sensor to the other sensors include information that ensures that incorrect transmission protocols are not selected or utilized by the other sensors. This may be considered validity or filtering information and a filtering operation may be performed. For example, the teacher sensor may send acceleration information (as measured by the sensor). When the student sensor receives this information, the student sensor may compare its own acceleration to the acceleration received in the incoming message. If the accelerations are the same (or within a predetermined tolerance of each other), then it is assumed that the sensors are on the same vehicle and that the student sensor can be configured according to the instructions (also in the message) received from the teacher sensor. If the accelerations are not the same (or within the predetermined tolerance), then it can be assumed that the teacher sensor and the student sensor are on different vehicles. In this case, it would not be proper for the student to learn a protocol from the teacher, and, consequently, the learning does not occur (the received message is ignored by the student sensor).

At step 308, second messages are directly received from other sensors via a receiver circuit at the TPM sensor. These messages may control protocols in the TPM sensor (i.e., this teacher sensor may now act as a student sensor).

Figure 4:
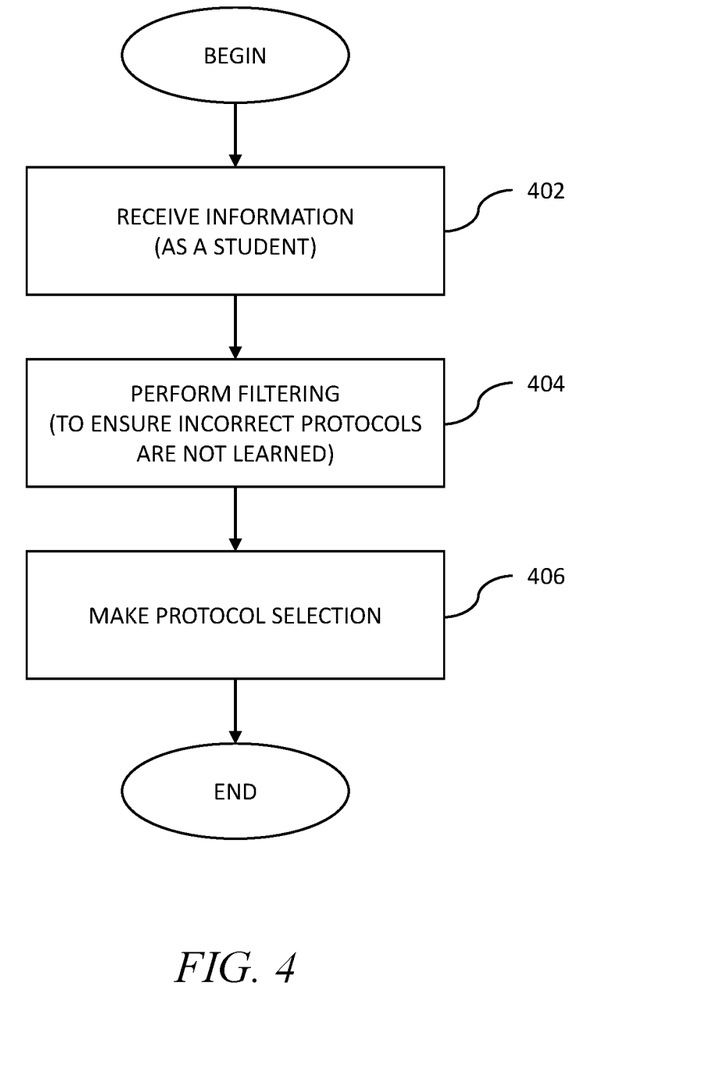
FIG. 4 comprises a flow diagram as configured in accordance with various embodiments of these teachings.

Referring now to FIG. 4, another example of an approach for operating a student TPM sensor is described.

At step 402, messages are received from a teacher sensor at the student sensor. The message includes instructions as to how to configure the student sensor (e.g., with which protocols the student sensor is to transmit messages). Validity (or filtering) information is also included.

At step 404, filtering is performed. This step ensures that incorrect protocols are not learned. By filtering, it is determined whether the teacher and student sensor are on the same vehicle. One example of a filtering operation has been described above with respect to FIG. 3 and another example will be described with respect to FIG. 5.

At step 406, the protocol selection is made. This may include physically activating the protocol in the student sensor as indicated in the instructions received from the teacher sensor.

Figure 5:
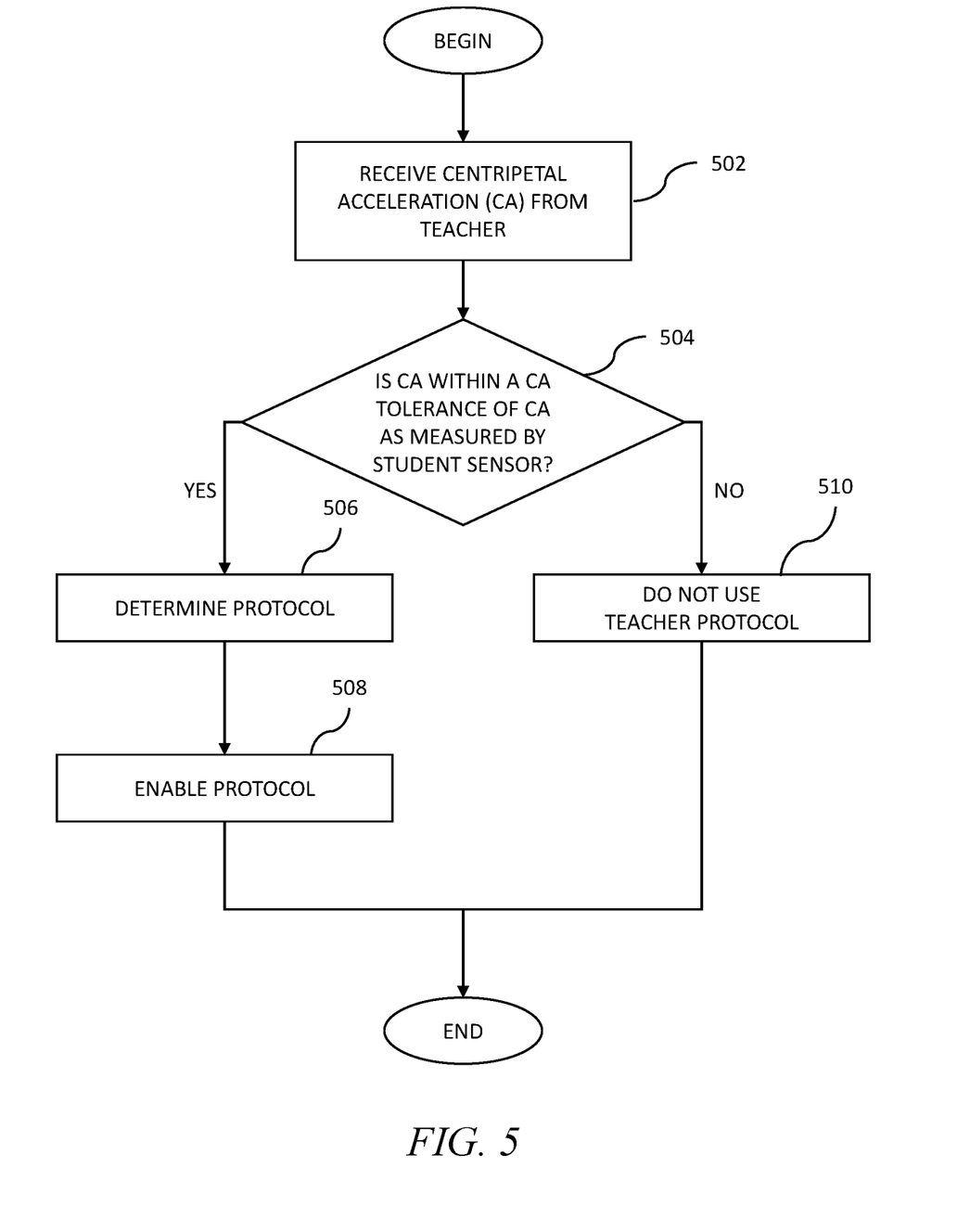
FIG. 5 comprises a flow diagram as configured in accordance with various embodiments of these teachings.

Referring now to FIG. 5, another example of an approach for operating a student TPM sensor is described. At step 502, centripetal acceleration (CA) information is received from a teacher sensor. This information will be used by the student sensor for verification (or filtering) purposes. The student sensor also measures a CA (the student CA).

At step 504, a determination is made as to ether the received CA (from the teacher sensor) is within a predetermined tolerance of the CA measured at the student sensor (the student CA). For example, a determination may be made whether these values are within 5% of each other.

If the answer at step 504 is affirmative, at step 506 a protocol is determined from the message received from the teacher sensor. The message itself may specify a protocol or protocols to use. At step 506, the protocols are enabled at the student sensor. In one example, bits may be switched (e.g., from a 0 to a 1) to enable a protocol already programmed at the student sensor to be used. In other examples, the protocol information may itself be sent from the teacher sensor. In still others of these examples, a combination of these approaches may be used. By a protocol, it is meant various characteristics of a transmitted message, for instance, the baud rate, frequency, formation, information contained, and so forth to be used to transmit pressure information from the sensor to the vehicle control unit.

If the answer at step 504 is negative, at step 510 the teacher-specified protocol (received in the message from the teacher) is not used. In some examples, the message from the teacher sensor is ignored and no configuration changes to the student sensor are made.

Figure 6:
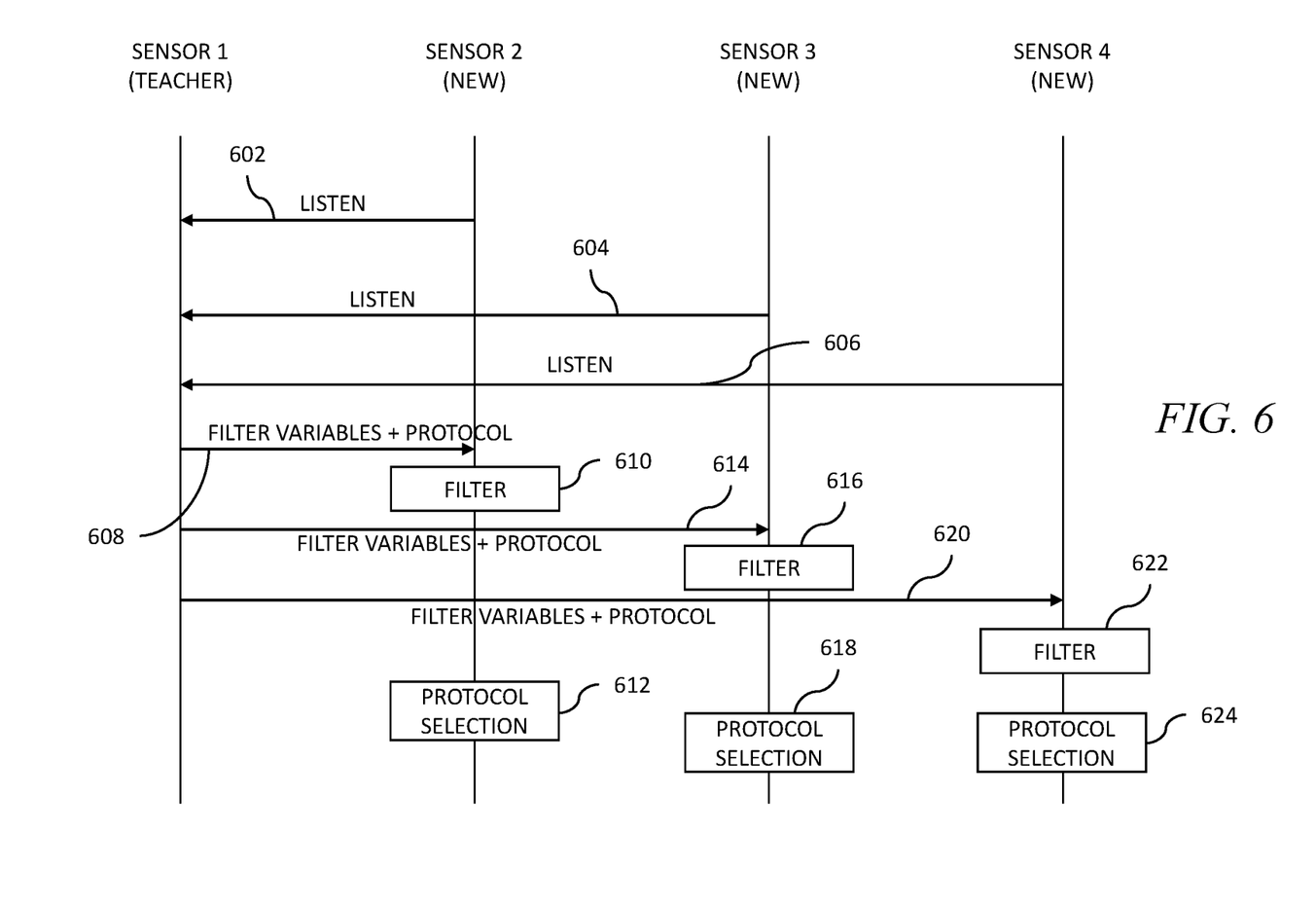
FIG. 6 comprises a flow diagram as configured in accordance with various embodiments of these teachings.

Referring now to FIG. 6, one example of operating a sensor arrangement with one teacher sensor (sensor 1) and three student sensors (sensors 2, 3, and 4) is described. In this example, the three student sensors (sensors 2, 3, and 4) are new to a vehicle and will learn a transmission protocol to use to transmit messages from the teacher sensor (sensor 1).

At step 602, sensor 2 listens for messages from the teacher sensor (sensor 1). At step 604, sensor 3 listens for messages from the teacher sensor (sensor 1). At step 606, sensor 4 listens for messages from the teacher sensor (sensor 1).

At step 608, the teacher sensor (sensor 1) sends filter variables (e.g., an acceleration and/or temperature) to sensor 2 to be used by sensor 2 (the student) in verifying whether it is proper to be configured by the teacher sensor (sensor 1). At step 612, the filter variables are used as a "filter" at sensor 2 to determine whether sensor 2 should be programmed according to the teacher sensor (sensor 1). For example, the student sensor may measure its own acceleration and temperature and compare these to acceleration received from sensor 1 (that was measured at sensor 1) and the temperature received from sensor 1 (and was measured at sensor 1). If the comparison indicates the filter variables measured at sensor 1 and sensor 2 are sufficiently close (e.g., within 5% of each other), then it is assumed that sensor 1 and sensor 2 are on the same vehicle and programming or configuration of sensor 2 takes place at step 614.

At step 614, the teacher sensor (sensor 1 sends filter variables (e.g., an acceleration and/or temperature) to sensor 3 to be used by sensor 3 (the student) in verifying whether it is proper to be configured by the teacher sensor (sensor 1). At step 616, the filter variables are used as a "filter" at sensor 3 to determine whether sensor 3 should be programmed according to the teacher sensor (sensor 1). For example, the student sensor may measure its own acceleration and temperature and compare these to acceleration received from sensor 1 (that was measured at sensor 1) and the temperature received from sensor 1 (and that was measured at sensor 1). If the comparison indicates the filter variables measured at sensor 1 and sensor 3 are sufficiently close (e.g., with 5% of each other), then it is assumed that sensor 1 and sensor 3 are on the same vehicle and programming or configuration of sensor 3 takes place at step 618.

At step 620, the teacher sensor (sensor 1) sends filter variables (e.g., an acceleration and/or temperature) to sensor 4 to be used by sensor 4 (the student) in verifying whether it is proper to be configured by the teacher sensor (sensor 1). At step 622, the filter variables are used as a "filter" at sensor 4 to determine whether sensor 4 should be programmed according to the teacher sensor (sensor 1). For example, the student sensor may measure its own acceleration and temperature and compare these to acceleration received from sensor 1 (that was measured at sensor 1) and the temperature received from sensor 1 (and was measured at sensor 1). If the comparison indicates the filter variables measured at sensor 1 and sensor 4 are sufficiently close (e.g., with 5% of each other), then it is assumed that sensor 1 and sensor 4 are on the same vehicle and programming or configuration of sensor 4 takes place at step 624.

Although shown as three separate transmissions (608, 614, and 620), it will be appreciated that the three separate transmission may be a single transmission that is simultaneously sent from sensor 1 to sensors 2, 3, and 4.

Figure 7:
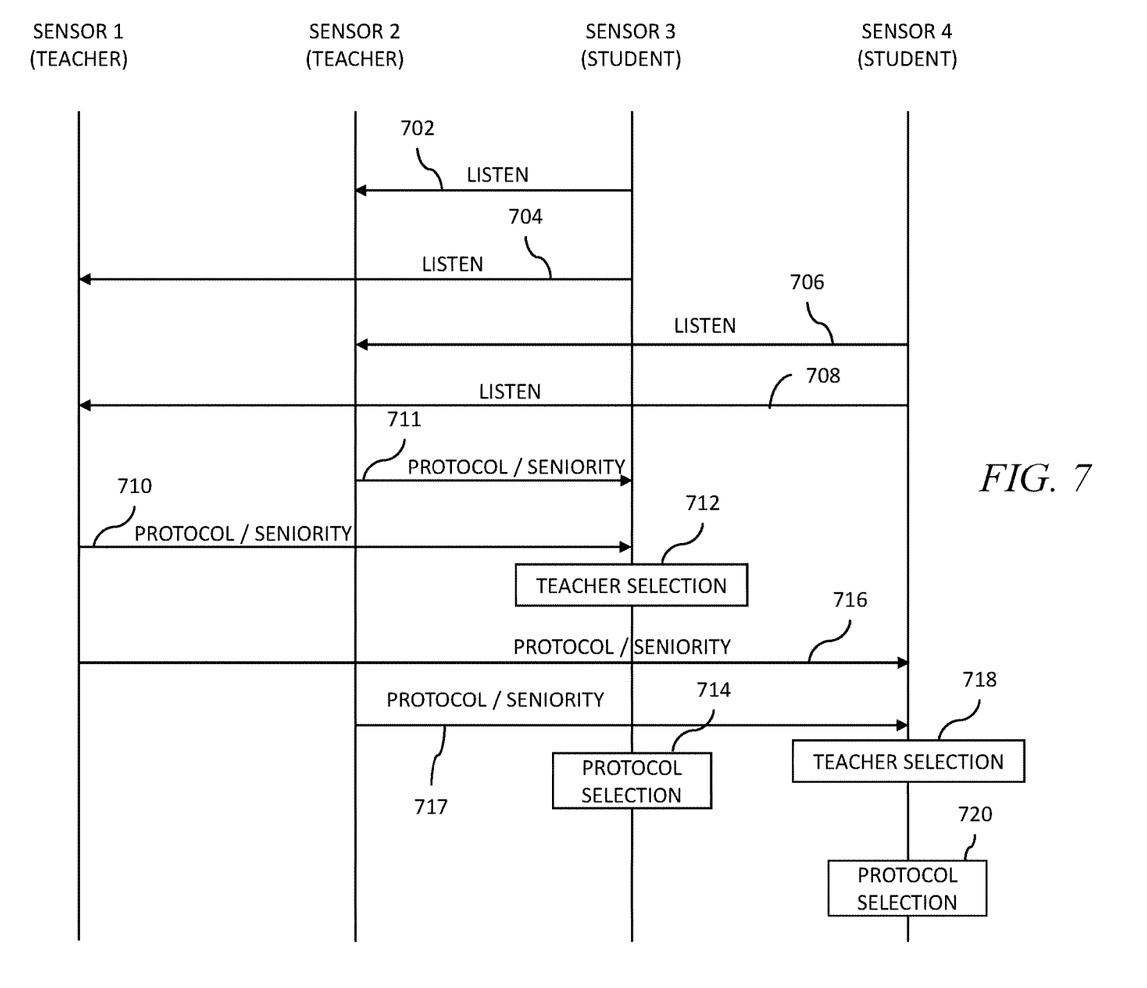
FIG. 7 comprises a flow diagram as configured in accordance with various embodiments of these teachings.

Referring now to FIG. 7, another example of operating a sensor arrangement is described. In this example, two new sensors (sensors 3 and 4) are to be added to a vehicle, but there are two teacher sensors (sensors 1 and 2).

At step 702, sensor 3 listens for messages from the first teacher sensor (sensor 1). At step 704, sensor 3 listens for messages from the second teacher sensor (sensor 2). At step 706, sensor 4 listens for messages from the first teacher sensor (sensor 1). At step 708, sensor 4 listens for messages from the second teacher sensor (sensor 2).

At step 710, the first teacher sensor (sensor 1) sends protocol instructions and seniority information to sensor 3. At step 711, the second teacher sensor (sensor 2) sends (potentially) protocol instructions and (likely different) seniority information to sensor 3. The seniority information from sensor 1 may indicate how long sensor 1 has been a teacher sensor. Similarly, the seniority information from sensor 2 (the second teacher) may indicate how long sensor 2 has been a teacher. At step 712, a selection by sensor 3 of which teacher to use as a teacher is made. In aspects, the sensor (sensor 1 or 2) with the most seniority (has been a teacher for the longest time) is made. In the event of a tie, a random selection may be made. Each of the messages includes instructions as to which protocol to use, so the protocol specified in the message of the chosen teacher is used. It will be understood that a verification may also be performed as described elsewhere herein (e.g., with respect to FIG. 5). In this case, the message from the chosen teacher also includes filter variable information and this can be used to verify that the teacher is on the same vehicle as the student (sensor 3). At step 714, this protocol selection is made.

At step 716, the first teacher sensor (sensor 1) sends protocol instructions and seniority information to sensor 4. At step 717, the second teacher sensor (sensor 2) sends (potentially) protocol instructions and (likely different) seniority information to sensor 4. As mentioned, the seniority information from sensor 1 may indicate how long sensor 1 has been a teacher sensor. Similarly, the seniority information from sensor 2 (the second teacher) may indicate how long sensor 2 has been a teacher. At step 718, a selection by sensor 4 of which teacher to use as a teacher is made. In aspects, the sensor (sensor 1 or with the most seniority (has been a teacher for the longest time) is made. In the event of a tie, a random selection may be made. Each of the messages includes instructions as to which protocol to use, so the protocol specified in the message of the chosen teacher is used. It will be understood that a verification may also be performed as described elsewhere herein (e.g., with respect to FIG. 5). In this case, the message from the chosen teacher also includes filter variable information and this can be used to verify that the teacher is on the same vehicle as the student (sensor 4). At step 720, this protocol selection is made.

Although shown as separate transmissions (716, 716), it gill be appreciated that the two separate transmission may be a single transmission that is simultaneously sent from sensor 1 to sensors 3 and 4. Similarly, although shown as separate transmissions (711, 717), it will be appreciated that the two separate transmission may be a single transmission that is simultaneously sent from sensor 2 to sensors 3 and 4.

It should be understood that any of the devices described herein (e.g., the control circuits, the receivers, receiver circuits, transmitter circuits, the sensors, any presentation or display devices, or any external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The electronic memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a non-volatile computer media (e.g., a computer memory as described above) and these instructions can be executed on a processing device such as a microprocessor. However, these approaches can be implemented as any combination of electronic hardware and/or software.

Preferred embodiments of this disclosure are described herein, including the best mode known to the inventor(s). It should be understood that the illustrated embodiments are exemplary only and should not be taken as limiting the scope of the appended claims.

What is claimed is:

1. A tire pressure monitoring sensor, the TPM sensor comprising:
   a pressure sensing device that is configured to sense pressure information of a tire;
   a transmission buffer coupled to the sensing device, the transmission buffer utilized to store the sensed pressure information;
   a transmitter circuit coupled to the transmission buffer and that is configured to transmit the sensed pressure information to a vehicle control unit in a vehicle;
   a receiver circuit that is configured to receive information directly from other TPM sensors in the vehicle;
   a control circuit that is coupled to the pressure sensing device, the transmitter circuit, and the receiver circuit; the control circuit being configured to transmit first messages directly to the other sensors via the transmission buffer and transmitter circuit, and directly receive second messages from the other sensors via the receiver circuit;
   wherein the TPM sensor is configured to operate as a teacher sensor to the other sensors, and wherein the first messages sent by the TPM sensor to the other sensors include first validity information that ensure that an incorrect transmission protocol is not selected or utilized by the other sensors.

2. The TPM sensor of claim 1, wherein the first validity information includes centripetal acceleration information from the TPM sensor, pressure information from the TPM sensor, and temperature information from the TPM sensor.

3. The TPM sensor of claim 1, wherein the TPM sensor is configured to receive the second messages from another teacher TPM sensor and to determine a transmission protocol based upon the second messages, and wherein the second messages sent by the another teacher TPM sensor includes second validity information and wherein the second validity information is utilized by the TPM sensor to ensure that an incorrect transmission protocol is not selected or utilized.

4. The TPM sensor of claim 3, wherein the second validity information includes centripetal acceleration information from the another TPM teacher sensor, pressure information from the another TPM teacher sensor, and temperature information from the another TPM teacher sensor.

5. The TPM sensor of claim 1, wherein the TPM sensor stores vehicle information associated with the vehicle to which it is deployed and transmits the vehicle information to other sensors in other vehicles to establish a record of sensor deployment.

6. The TPM sensor of claim 1, wherein the transmitted first messages and received second messages utilize one or more of the Bluetooth protocol, the Bluetooth low energy (BLE) protocol, or radio frequency (RF) communications.

7. The TPM sensor of claim 1, further comprising a memory storage device, the memory storage device including a plurality of protocols.

8. A method of operating a tire pressure monitoring sensor, the method comprising:
   sensing pressure information of a tire at a pressure sensing device at a tire pressure monitoring (TPM) sensor;
   storing the sensed pressure information at a transmission buffer at the TPM sensor and sending the sensed pressure information to a vehicle control unit in a vehicle via the transmission buffer and a transmitter circuit;
   transmitting first messages directly to other sensors via the transmission buffer and a transmitter circuit at the TPM sensor; and
   directly receiving second messages from the other sensors via a receiver circuit at the TPM sensor;
   wherein the TPM sensor is configured to operate as a teacher sensor to the other sensors, and wherein the first messages sent by the TPM sensor to the other sensors include validity information that ensure that an incorrect transmission protocol is not selected or utilized by the other sensors.

9. The method of claim 8, wherein the validity information includes centripetal acceleration information from the TPM sensor, pressure information from the TPM sensor, and temperature information from the TPM sensor.

10. The method of claim 8, wherein the TPM sensor is configured to receive the second messages from another teacher TPM sensor and to determine a transmission protocol based upon the second messages, and wherein the second messages sent by the another teacher TPM sensor include second validity information and wherein the second validity information is utilized by the TPM sensor to ensure that an incorrect transmission protocol is not selected or utilized by the TPM sensor.

11. The method of claim 10, wherein the second validity information includes centripetal acceleration information from the another TPM teacher sensor, pressure information from the another TPM teacher sensor, and temperature information from the another TPM teacher sensor.

12. The method of claim 8, wherein the transmitted first messages and received second messages utilize one or more of the Bluetooth protocol, the Bluetooth low energy (BLE) protocol, or radio frequency (RP) communications.

13. The method of claim 8, further comprising providing a memory storage device at the TPM sensor, the memory storage device including a plurality of protocols.

14. A computer readable non-transitory medium having a computer readable program code embodied therein, the computer readable program code adapted to be executed to implement a method of operating a tire pressure monitoring system, the method comprising:
   sensing pressure information of a tire at a pressure sensing device at a tire pressure monitoring (TPM) sensor;
   storing the sensed pressure information at a transmission buffer at the TPM sensor and sending the sensed pressure information to a vehicle control unit in a vehicle via the transmission buffer and a transmitter circuit;
   transmitting first messages directly to other sensors via the transmission buffer and a transmitter circuit at the TPM sensor; and
   directly receiving second messages from the other sensors via a receiver circuit at the TPM sensor;
   wherein the TPM sensor is configured to operate as a teacher sensor to the other sensors, and wherein the first messages sent by the TPM sensor to the other sensors includes first validity information that ensure that an incorrect transmission protocol is not selected or utilized by the other sensors.

15. The computer readable non-transitory medium of claim 14, wherein the first validity information includes centripetal acceleration information from the TPM sensor, pressure information from the TPM sensor, and temperature information from the TPM sensor.

16. The computer readable non-transitory medium of claim 14, wherein the TPM sensor is configured to receive the second messages from another teacher TPM sensor and to determine a transmission protocol based upon the second messages, and wherein the second messages sent by the another teacher TPM sensor include second validity information and wherein the second validity information is utilized by TPM sensor to ensure that an incorrect transmission protocol is not selected or utilized by the TPM sensor.

17. The computer readable non-transitory medium of claim 16, wherein the second validity information includes centripetal acceleration information from the another TPM teacher sensor, pressure information from the another TPM teacher sensor, and temperature information from the another TPM teacher sensor.

18. The computer readable non-transitory medium of claim 14, wherein the transmitted first messages and received second messages utilize one or more of the Bluetooth protocol, the Bluetooth low energy (BLE) protocol, or radio frequency (RF) communications.

* * * * *